(No Model.)
S. J. M. COX.
HORSE COLLAR.
No. 322,260. Patented July 14, 1885.
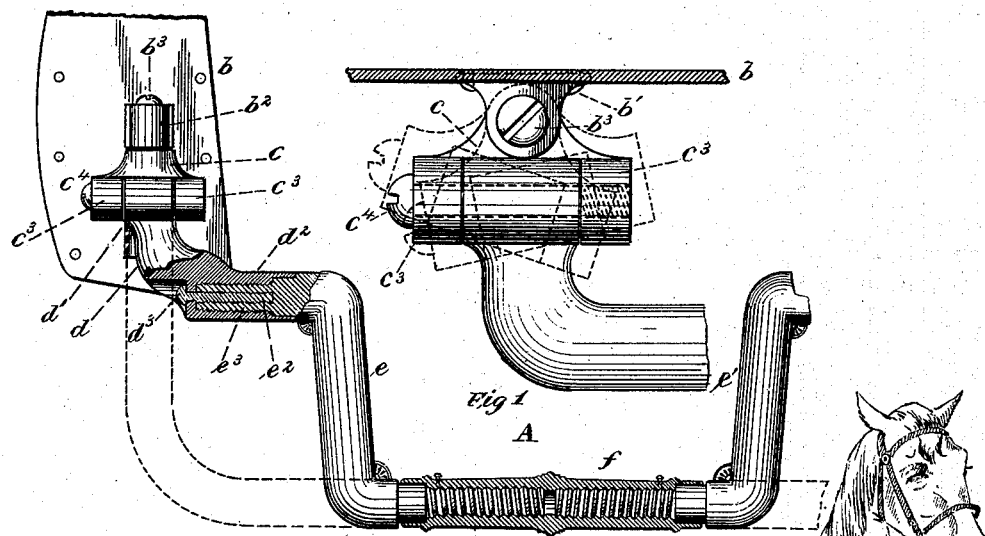
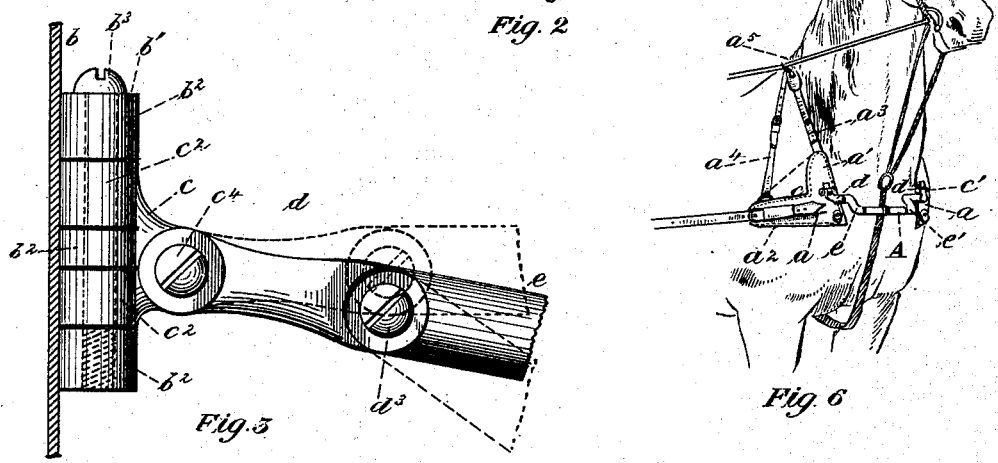
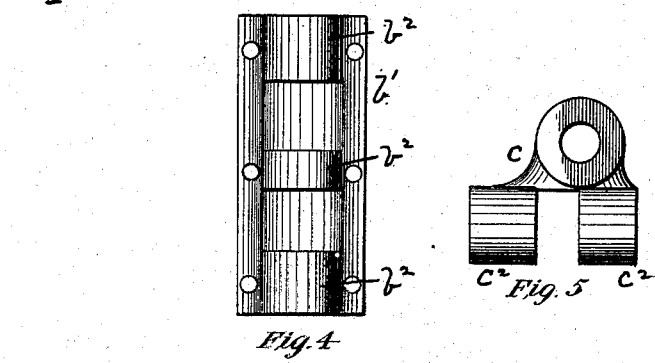
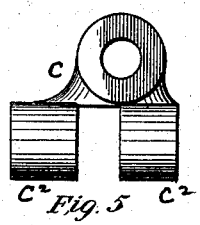
WITNESSES
G. P. Kramer
P. K. McNickle
Seaborn J. M. Cox,
INVENTOR,
By R. S. & A. P. Lacey,
His Attorney.

UNITED STATES PATENT OFFICE.

SEABORN JAMES MONROE COX, OF JOHNSTON, SOUTH CAROLINA.

HORSE-COLLAR.

SPECIFICATION forming part of Letters Patent No. 322,260, dated July 14, 1885.

Application filed June 27, 1884. (No model.)

*To all whom it may concern:*

Be it known that I, SEABORN JAMES MONROE COX, a citizen of the United States, residing at Johnston, in the county of Edgefield and State of South Carolina, have invented a new and useful Horse-Collar, of which the following is the specification.

My invention relates to improvements in horse-collars in which the horse has been considered in every part connected therewith, namely, to relieve the animal of all punishment from badly-fitted collars and bring about ease and comfort; second, to facilitate the drawing-powers of the animal, and also free action of point of shoulders and limbs, causing an even draft.

In the accompanying drawings, which illustrate my invention, Figure 1 is a top end view of one of the brackets having one end of the breast-iron attached thereto. Fig. 2 is a front view, partially in section, showing a little more than one-half of the breast-iron. Fig. 3 is a side view of one of the brackets and its pivoted arm, and Figs. 4 and 5 are detail views, and Fig. 6 shows the device applied to the shoulders of a horse.

$a\ a$, Fig. 6, are the two draft-pads of my horse-collar, made of leather or any other suitable material, and to which the traces are attached, as shown. Each draft-pad is made, preferably, in the L-shape form, having the upper or shoulder wing, $a'$, which lies on the shoulder of the horse, and the lower or side wing, $a^2$, which extends back along the side of the shoulder. To the upper end of the shoulder-wing a supporting strap or hanger, $a^3$, is attached, and to the rear end of the lower wing the hanger $a^4$ is attached. These hangers may be attached by sewing them directly to the collar; or they may be made in two parts, one part being sewed to the collar and united to the other by an intermediate buckle. The hangers have their upper ends brought close together, and are united to the sweat-pad $a^5$, resting on the wither of the horse. The draft-pad could be made in triangular form, as indicated by dotted line, Fig. 6; but I prefer to make it L shape, as shown, because it gives the same results for draft purposes and is cooler in its application to the animal. The hangers are preferably provided with buckles, as shown, so that the draft-pads may be adjusted to the shoulder. The two pads $a\ a$ are exactly alike, except as to the adaptation necessary for the different shoulders—right and left—of the animals. The hangers of the right and left pads are joined to and are supported by the sweat-pad $a^5$, as will be understood by any one accustomed to the use of harness. The draft-pads are disconnected at their front ends except by the breast-iron, hereinafter fully described.

In applying my breast-iron I employ a base-plate, $b$, of metal or other suitable material, which is sewed into or riveted in place in the draft-pad, under the outer covering thereof. To this plate the bracket $b'$ is made fast. The bracket may be made as one integral part of the plate, or may be made separate therefrom and be secured thereto by rivets. The base-plate could be entirely dispensed with, and the bracket could be riveted to a foundation of leather having strength sufficient to sustain the strain exerted upon the bracket.

The bracket is made, preferably, with three lugs, $b^2$, provided with coincident bolt-holes adapted to receive the pivot-bolt for holding the end of the breast-iron.

A clip, $c$, has lugs $c^2$, which fit between the lugs of the bracket $b'$ and form therewith a hinge-joint, as shown. The lugs $c^2$ are provided with bolt-holes, which register with the holes in lugs $b^2$ and receive the pivot-bolt $b^3$. The clip $c$ is provided with jaws $c^3$, adapted to receive the eye $d^2$ on the arm $d$ of the breast-iron. The arm is held by the pivot-bolt $c^4$ so that it will turn readily thereon. By means of the two hinge-joints it will be seen that the arm may be turned horizontally or vertically.

The breast-iron A is composed of two arms, $d\ d'$, cranks or elbow-pieces $e\ e'$, and the sleeve $b$. I prefer to make the breast-iron in the five pieces, as shown, and with the two hinge-joints between the arms $d\ d'$ and the draft-pad. If all animals had the same size and form, there would be no necessity for the joints formed by the arms $d\ d'$ and clips $c\ c'$, and the breast-iron could be made in a single piece and in form indicated by dotted lines in Fig. 2. Such construction would be slightly inconvenient and cumbersome, but could be readily used. I prefer to make the iron in the several pieces, as shown, which particular construction and use thereof I will now describe.

The arms $d$ $d'$ are bent at an angle, and have formed in the outer ends threaded sockets $d^2$, adapted to receive the threaded shanks $e^2$ on the elbow-irons $e$ $e'$. Set-screws $a^3$ are put through from the outer side and extended into threaded opening $e^3$ in the shanks $e^2$. By means of the set-screw the elbow-irons $e$ $e'$ may be set and held at any desired angle. If it be desired to set the elbow-iron at a different angle, the screws $d^3$ are loosened and the elbow-iron is then turned to the desired angle, after which the set-screw is tightened. This setting of the elbow-iron is to adapt it to the different fullnesses which appear in the breasts of different animals.

The joint between the arm and the elbow-iron permits the said arm to turn on its pivot to a desired position, while the said angle-iron may be turned outward to adapt it to the fullness of the breast.

The outer end of the elbow-irons are bent in a horizontal plane in front of the breast, and so that their ends will come together, if desired. These approximate ends are threaded, as shown. On one a right-hand thread is cut and on the other a left-hand thread is cut. On these threaded ends a sleeve-nut, $f$, is placed, having right and left hand threads corresponding to the threads on the approximate ends of the elbow-irons. By means of the sleeve-nut the ends of the irons may be drawn together or moved farther apart, which movement enables me to set the breast-iron to animals having breasts of different widths.

It will be seen that I have provided a device which may be adapted to any size animal.

I am aware that prior to my invention various methods have been resorted to to connect collars in front of the breast and neck of the animals; but I am not aware of any devices that are like mine. My device adjusts itself to the movements of the shoulder when the animal is moving. It causes the draft to be thrown directly on that portion of incline of the shoulder and above the point thereof and gives an even draft and relieves all portions of the said shoulder that should not be pressed upon. It will be seen that the pressure is confined to the point in line with the trace. There is no pressure upon the wind-pipe. It holds the pads firm and steady in place and prevents any friction by sliding.

I do not confine the application of my breast-iron to the particular form of draft-pads shown in the drawings. An ordinary collar, to be made open at its lower end, so as to remove all portions in front of the wind-pipe of the animal that would prevent swallowing and circulation, and my iron could be applied, and would hold the said collar firmly in place. I prefer to use the draft-pad as shown and described, because it gives far better results in protecting and relieving the shoulder from the injuries which follow the use of the ordinary collar.

Having thus described my invention, what I claim, and desire to secure by Letters Patent, is—

1. The combination, with the draft-pads, of a breast-iron made in two sections, each section secured to one of the pads, and an adjusting-coupling uniting the free ends of the sections to increase or diminish the distance between them and the pads, substantially as and for the purposes described.

2. The combination, with the draft-pads of a horse-collar, of a breast-iron attached to and uniting the pads, said iron being made in sections the proximate ends of which are provided with right-hand and left-hand threads, and a sleeve-nut adapted to work upon the threaded portions of said proximate ends, substantially as set forth.

3. The combination of the draft-pads of a horse-collar, brackets riveted to the pads, arms pivoted to the brackets, and having threaded sockets in their outer ends, elbow-irons threaded into the sockets in the arms and held by set-screws, and having their proximate ends provided with right-hand and left-hand threads, and a sleeve-nut working upon the said proximate ends, substantially as set forth.

4. The horse-collar, hereinbefore described, consisting of draft-pads, hangers secured to the draft-pads, and having their upper ends united and secured to the sweat-pad, and a breast-iron pivotally connected to the lower ends of the draft-pads, substantially as set forth.

SEABORN JAMES MONROE COX.

Witnesses:
JOHN WESLEY CALHOUN,
WILLIAM LEE CALHOUN.